(12) United States Patent
Li

(10) Patent No.: US 12,531,694 B2
(45) Date of Patent: Jan. 20, 2026

(54) METHOD AND APPARATUS FOR TRANSMITTING POSITIONING-PURPOSE REFERENCE SIGNALS, EQUIPMENT AND STORAGE MEDIUM

(71) Applicant: Beijing Xiaomi Mobile Software Co., Ltd., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 540 days.

(21) Appl. No.: 17/999,385

(22) PCT Filed: May 22, 2020

(86) PCT No.: PCT/CN2020/091927
§ 371 (c)(1),
(2) Date: Nov. 18, 2022

(87) PCT Pub. No.: WO2021/232437
PCT Pub. Date: Nov. 25, 2021

(65) Prior Publication Data
US 2023/0208590 A1   Jun. 29, 2023

(51) Int. Cl.
*H04L 5/00* (2006.01)
*H04W 16/28* (2009.01)
*H04W 64/00* (2009.01)

(52) U.S. Cl.
CPC ........... *H04L 5/0051* (2013.01); *H04W 16/28* (2013.01); *H04W 64/00* (2013.01)

(58) Field of Classification Search
CPC ...... H04L 5/0051; H04W 16/28; H04W 64/00
See application file for complete search history.

(56) References Cited

U.S. PATENT DOCUMENTS

| 10,231,207 | B2* | 3/2019 | Lee ..................... H04W 64/006 |
| 11,671,141 | B2* | 6/2023 | Wang ..................... H04B 1/713 370/329 |
| 12,025,724 | B2* | 7/2024 | Alawieh ............... H04W 64/00 |
| 2013/0100833 | A1* | 4/2013 | Xu ....................... H04J 13/0062 370/252 |
| 2014/0146777 | A1* | 5/2014 | Shin ....................... H04L 5/0096 370/329 |
| 2019/0013909 | A1* | 1/2019 | Li ......................... H04L 5/0048 |
| 2019/0199555 | A1* | 6/2019 | Munier ................. H04L 5/0096 |
| 2019/0208366 | A1* | 7/2019 | Sosnin .................. G01S 13/876 |
| 2019/0268185 | A1* | 8/2019 | Wang .................. H04L 27/2613 |
| 2019/0380056 | A1* | 12/2019 | Lee ....................... H04B 7/0695 |
| 2020/0092055 | A1* | 3/2020 | Choi ........................ H04L 5/005 |
| 2020/0092901 | A1* | 3/2020 | Barabell .............. H04B 17/318 |
| 2020/0163079 | A1* | 5/2020 | Choi ..................... H04L 5/0064 |
| 2020/0204313 | A1* | 6/2020 | Choi ..................... H04L 5/0048 |

(Continued)

FOREIGN PATENT DOCUMENTS

| CN | 106716899 A | 5/2017 |
| CN | 110100407 A | 8/2019 |

(Continued)

*Primary Examiner* — Parth Patel
(74) *Attorney, Agent, or Firm* — McCoy Russell LLP

(57) ABSTRACT

A method for transmitting positioning-purpose reference signals comprises: simultaneously transmitting, by means of N antenna ports, positioning-purpose reference signals among one or more network devices.

15 Claims, 4 Drawing Sheets

(56) References Cited

U.S. PATENT DOCUMENTS

| | | | | |
|---|---|---|---|---|
| 2020/0213161 A1* | 7/2020 | Zhang | .................. | H04W 80/08 |
| 2021/0044458 A1* | 2/2021 | Gao | ...................... | H04L 5/0094 |
| 2021/0135823 A1* | 5/2021 | Zhang | .................. | H04B 7/0684 |
| 2021/0136748 A1* | 5/2021 | Choi | ...................... | H04L 5/0051 |
| 2021/0160812 A1* | 5/2021 | Manolakos | ........... | H04W 4/025 |
| 2021/0185632 A1* | 6/2021 | Manolakos | ............. | H04L 1/0013 |
| 2021/0367657 A1* | 11/2021 | Chen | .................... | H04W 72/23 |
| 2021/0409967 A1* | 12/2021 | Franke | ................ | H04W 24/10 |
| 2022/0014329 A1* | 1/2022 | Qi | ....................... | H04W 72/046 |
| 2022/0021420 A1* | 1/2022 | Liu | ...................... | H04B 7/0413 |
| 2022/0229145 A1* | 7/2022 | Berggren | .............. | H04L 5/0082 |
| 2023/0020648 A1* | 1/2023 | Cha | ...................... | H04L 5/0048 |
| 2023/0147639 A1* | 5/2023 | Go | .......................... | H04W 8/24 |
| | | | | 455/101 |
| 2023/0208590 A1* | 6/2023 | Li | ......................... | H04L 5/0048 |
| | | | | 370/329 |
| 2023/0344589 A1* | 10/2023 | Shreevastav | ......... | H04L 5/0023 |
| 2024/0014849 A1* | 1/2024 | Wang | .................... | H04B 1/713 |
| 2025/0142394 A1* | 5/2025 | Hindy | ..................... | G06N 3/04 |

FOREIGN PATENT DOCUMENTS

| | | | |
|---|---|---|---|
| CN | 110168954 A | 8/2019 | |
| CN | 110999119 A | 4/2020 | |
| WO | WO-2012152000 A1 * | 11/2012 | .............. H04B 7/06 |

* cited by examiner

Transmit a positioning-purpose reference signal with one or more network equipment simultaneously by means of N antenna ports, where N is a positive integer greater than 1 — S101

FIG. 2

METHOD AND APPARATUS FOR TRANSMITTING POSITIONING-PURPOSE REFERENCE SIGNALS, EQUIPMENT AND STORAGE MEDIUM

CROSS REFERENCE TO RELATED APPLICATION

The present application is a U.S. National Phase of International Application No. PCT/CN2020/091927 entitled "METHOD AND APPARATUS FOR TRANSMITTING POSITIONING-PURPOSE REFERENCE SIGNALS, EQUIPMENT, AND STORAGE MEDIUM," and filed on May 22, 2020. The entire contents of the above-listed application are hereby incorporated by reference for all purposes.

BACKGROUND

A new radio (NR) Rel-16 system newly defines a reference signal for positioning, including: a downlink positioning reference signal (PRS) and a sounding reference signal (SRS) for an uplink positioning purpose.

SUMMARY

A method and an apparatus for transmitting a positioning-purpose reference signal, electronic equipment, and a computer-readable storage medium are provided in the present disclosure.

According to a first aspect, the present disclosure provides a method for transmitting a positioning-purpose reference signal which is applied to user equipment (UE), the method including:

transmitting the positioning-purpose reference signal with one or more network devices simultaneously through N antenna ports, where N is a positive integer greater than 1.

According to a second aspect, the present disclosure provides a kind of user equipment (UE) including: a processor, a memory, and a bus, where the bus is configured to be connected to the processor and the memory;

the memory is configured to store operation instructions; and the processor is configured to perform the method for transmitting a positioning-purpose reference signal according to the first aspect of the present disclosure by calling the operation instructions.

According to a third aspect, the present disclosure provides a non-transitory computer-readable storage medium storing a computer program, and the computer program is used to perform the method for transmitting a positioning-purpose reference signal according to the first aspect of the present disclosure.

BRIEF DESCRIPTION OF THE DRAWINGS

In order to more clearly describe the technical solutions in the embodiments of the present disclosure, the following will briefly introduce the accompanying drawings that need to be used in the description of the embodiments of the present disclosure.

FIG. 2 is a schematic diagram of a method for transmitting a positioning-purpose reference signal according to an embodiment of the present disclosure;

DETAILED DESCRIPTION

Figure 1:
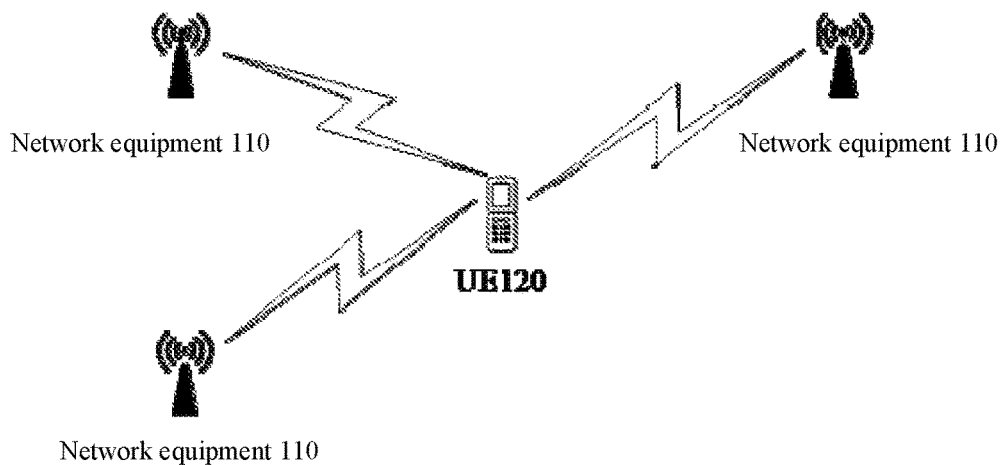
FIG. 1 is a schematic diagram of a network architecture according to an embodiment of the present disclosure.

In order to make the invention objectives, features, and advantages of the present disclosure or apparent and easy to understand, the technical solutions in the embodiments of the present disclosure will be clearly and completely described below with reference to the accompanying drawings in the embodiments of the present disclosure. The embodiments described are only some of the embodiments of the present disclosure, not all of them. All other embodiments obtained by those skilled in the art based on the embodiments of the present disclosure without any creative efforts shall fall within the protection scope of the present disclosure.

The following describes the embodiments of the present disclosure in detail, and examples of the embodiments are shown in the accompanying drawings, where the same or similar reference numerals throughout represent the same or similar elements or elements having the same or similar functions. The embodiments described below with reference to the accompanying drawings are examples, and are only used to explain the present disclosure, but cannot be explained as limitations on the present disclosure.

Those skilled in the art may understand that, unless otherwise stated, "a/an", "one", "said", and "the" in the singular form used in the specification may also include the plural form. It should be further understood that the words "comprise/include" used in the specification of the present disclosure refer to stated features, integers, steps, operations, elements, and/or components, but do not preclude the presence or addition of one or more other features, integers, steps, operations, elements and/or components, and/or combinations of the features, the integers, the steps, the operations, the elements and/or the components. It should be understood that when we say that an element is "connected" or "coupled" to another element, the element may be directly connected or coupled to other elements, or intermediate elements may also exist. In addition, the "connected" or "coupled" used in the specification may include wireless connection or wireless coupling. The words "and/or" used in the specification include all or any unit and all combinations of one or more of the associated listed items.

The disclosure relates to the field of radio communication technologies, and in particular, to a method and an apparatus for transmitting a positioning-purpose reference signal, equipment, and a computer-readable storage medium.

For the sounding reference signal (SRS) for an uplink positioning purpose and the downlink positioning reference signal (PRS), the Rel-16 only uses one antenna port to transmit or receive at present. Existing positioning solutions only support transmission or reception of a positioning-purpose reference signal of one antenna port, and positioning-purpose reference signals of a plurality of network devices and user equipment (UE) are transmitted serially in time, such that positioning time latency increases, and positioning accuracy reduces, for example, the positioning time latency can only reach an order of magnitude of one second, and the positioning accuracy can only reach an order of magnitude of ten meters.

For disadvantages in the existing manners, a method and an apparatus for transmitting a positioning-purpose reference signal, electronic equipment, and a computer-readable storage medium are provided in the present disclosure to solve a problem of how to reduce positioning time latency and improve positioning accuracy.

In order to better understand and describe the solutions of the embodiments of the present disclosure, some related technical terms in the embodiments of the present disclosure are simply described in the following.

In NR•Rel-17, due to consideration of scenarios such as industrial Internet of Things, positioning accuracy and time latency are highly required, for example, accuracy is less than 1 m, and time latency is less than 100 ms or even 10 ms. Future UE can also support to perform multiple-transmission and multiple-reception by using a plurality of antenna ports simultaneously.

For reception based on a beam, a base station indicates a transmission configuration indication (TCI) state of type•D through signaling, to notify the UE of the beam to be used during reception. When the UE receives any one of a physical downlink control channel (PDCCH), a physical downlink shared channel (PDSCH), and a downlink positioning-purpose reference signal, the TCI is used to notify that a reception beam used by the UE is the same as a reception beam when a synchronization signal block (SSB) or a channel state information reference signal (CSI-RS) is received, or the TCI is used to notify that a reception beam used by the UE is the same as a reception beam corresponding to a transmission beam of the UE transmitting a SRS. When the UE transmits any one of the physical uplink control channel (PUCCH), the physical uplink shared channel (PUSCH), and the uplink positioning-purpose reference signal, SpatialRelationInfo is used to notify that a transmission beam used by the UE is the same as a transmission beam of a transmitted reference signal (e.g., the SRS), or the SpatialRelationInfo is used to notify that a transmission beam used by the UE is the same as a transmission beam corresponding to a reception beam for receiving the SSB or the CSI-RS. For example, the TCI state indicates any one of a synchronization signal block identifier (SSB•ID), a channel state information reference signal identifier (CSI-RS•ID), and a sounding reference signal identifier (SRS•ID). When the TCI state indicates the SSB•ID or CSI-RS•ID, the base station indicates the UE to use a beam for receiving the SSB or CSI-RS corresponding to the SSB•ID or the CSI-RS. ID to receive downlink transmission; and when the TCI state indicates the SRS, the base station indicates the UE to use a reception beam corresponding to a transmission beam when transmitting the SRS corresponding to the SRS•ID to receive downlink transmission. For uplink PUSCH transmission based on the beam, the base station indicates an uplink beam direction through an SRS resource indication of a downlink control information (DCI) signaling indication. However, the SRS corresponding to the SRS resource indication of the DCI signaling indication is one of a plurality of SRS resources configured by radio resource control (RRC) signaling, and spatialrelationinfo is configured for each SRS resource and corresponds to the SSB•ID, the CSI-RS•ID, or the SRS•ID. That is, a transmission beam direction of the PUSCH is the same as the transmission beam of the SRS indicated by the spatialrelationinfo corresponding to the SRS resource indication, or a transmission beam direction of the PUSCH is the same as the transmission beam corresponding to the reception beam of the SSB or the CSI-RS indicated by the spatialrelationinfo corresponding to the SRS resource indication.

The following describes the technical solutions of the present disclosure and how the technical solutions of the disclosure solve the above technical problems with specific embodiments in detail. The following specific embodiments may be combined with each other, and the same or similar concepts or processes may not be described in detail in some embodiments. The embodiments of the present disclosure will be described below with reference to the accompanying drawings.

The network architectures and service scenarios described in the embodiments of the present disclosure are to more clearly describe the technical solutions of the embodiments of the present disclosure, and do not limit the technical solutions provided in the embodiments of the present disclosure. Those of ordinary skill in the art may know that, with the evolution of the network architectures and the emergence of new service scenarios, the technical solutions provided in the embodiments of the present disclosure are also applicable to similar technical problems.

A schematic diagram of a network architecture according to an embodiment of the present disclosure is shown in FIG. 1, and the network architecture includes a plurality of network devices 110 and UE 120. The plurality of network devices 110 is deployed in an access network. For example, the plurality of network devices 110 is deployed in a new generation-radio access network (NG-RAN) in a 5G system. The plurality of network devices 110 are in communication with the UE 120 using a certain air interface technology, for example, the plurality of network devices 110 may be in communication with the UE 120 through a cellular technology.

In an embodiment of the present disclosure, the network device 110 includes a base station, and types of the base station include various forms of macro base station, micro base station, relay station, access point, etc. The network device may further refer to different transmission reception points of the same base station, or different antenna panels of the same base station. Types of the UE120 include a phone, a vehicle user terminal, a tablet computer, a laptop computer, a personal digital assistant, a mobile surfing apparatus, a wearable equipment, etc. Types of the UE120 further include an Internet of Things equipment terminal and an industrial Internet of Things equipment terminal. In vehicle network communication, the network device and the UE may be vehicle-mounted terminals.

In an embodiment of the present disclosure, there is provided a method for transmitting a positioning-purpose reference signal, and a schematic diagram of the method is as shown in FIG. 2, and the method is applied to user equipment (UE), the method including:

S101: transmitting the positioning-purpose reference signal with one or more network devices simultaneously through N antenna ports, where N is a positive integer greater than 1.

In an embodiment of the present disclosure, a plurality of antenna ports are configured for the UE, such that the UE may receive a positioning reference signal (PRS) by simultaneously using the plurality of antenna ports when receiving downlink information, and the UE may transmit an uplink sounding reference signal (SRS) by simultaneously using the plurality of antenna ports when transmitting uplink information. The network device may include one or more network devices, and the plurality of network devices may be a plurality of base stations, a plurality of cells, a plurality of transmission reception points (the plurality of transmission reception points may be different transmission reception points of the same cell, or different transmission reception points of different cells), or a plurality of antenna panels (the plurality of antenna panels may be different antenna panels of the same transmission reception point, or different antenna panels of different transmission reception points, or different antenna panels of different cells).

In an embodiment of the present disclosure, the positioning-purpose reference signal includes a downlink positioning reference signal (PRS) and/or an uplink positioning-purpose sounding reference signal (SRS).

In an embodiment of the present disclosure, when the positioning-purpose reference signal includes the PRS, transmitting the positioning-purpose reference signal with one or more network devices simultaneously through N antenna ports includes:

simultaneously receiving PRSs transmitted by the one or more network devices through the N antenna ports.

In an embodiment of the present disclosure, different antenna ports may receive PRSs of different network devices simultaneously, and different antenna ports may also receive a PRS of one network device simultaneously, for example, there are four antenna ports respectively being port 1, port 2, port 3, and port 4, and three network devices respectively being equipment 1, equipment 2, and equipment 3, and corresponding reception mapping may be shown in the following Table 1:

TABLE 1

A mapping relationship between an antenna port and the network device

| Antenna port | Network device |
| --- | --- |
| Port1 | Equipment 1 |
| Port2 | Equipment 2 |
| Port3 | Equipment 3 |
| Port4 | Equipment 3 |

As shown in Table 1, the port 1 transmits with the network device 1, and at the same time, the port 2 transmits with the network device 2, and the port 3 and the port 4 transmit with the network device 3 simultaneously. Those of ordinary skill in the art should know that Table 1 is just an example, and there may be a plurality of conditions in an actual application scenario, which are not limited in this embodiment.

In another embodiment of the present disclosure, when the positioning-purpose reference signal includes the SRS for an uplink positioning purpose, transmitting the positioning-purpose reference signal with one or more network devices simultaneously through N antenna ports includes:

transmitting the SRS to the one or more network devices simultaneously through the N antenna ports.

In an embodiment of the present disclosure, corresponding to that different antenna ports may receive the PRSs of different network devices simultaneously, different antenna ports may transmit an uplink sounding reference signal (SRS) to different network devices.

In an embodiment of the present disclosure, transmitting the positioning-purpose reference signal with one or more network devices simultaneously through N antenna ports includes:

receiving configuration parameter information of the positioning-purpose reference signal configured by the network device where a Serving Cell is located and/or a long term evolution (LTE) location management function (LMF), where the configuration parameter information of the positioning-purpose reference signal is used to indicate a configuration parameter of the positioning-purpose reference signal; and transmitting, based on the configuration parameter of the positioning-purpose reference signal, the positioning-purpose reference signal with the one or more network devices simultaneously through the N antenna ports.

The Serving Cell may refer to the Primary Cell (PCell), or it may also refer to the Primary Secondary Cell (PSCell), or it may also refer to the Secondary Cell (SCell).

In an embodiment of the present disclosure, the network device for the positioning-purpose reference signal to transmit the configuration parameter information of the positioning-purpose reference signal mainly includes the network device where the Serving Cell of the UE is located. In an implementation, the configuration parameter information of the positioning-purpose reference signal transmitted by the Serving Cell includes configuration parameter information of the positioning-purpose reference signal for indicating transmission between the UE and the Serving Cell, and/or configuration parameter information of the positioning-purpose reference signal for indicating transmission between the UE and a neighboring cell.

In an embodiment of the present disclosure, the configuration parameter of the positioning-purpose reference signal includes one or more of the following:

a resource set identifier of the positioning-purpose reference signal;

a resource identifier of the positioning-purpose reference signal;

an antenna port identifier of the positioning-purpose reference signal;

beam direction indication information of the positioning-purpose reference signal;

a first parameter set corresponding to a time domain resource of the positioning-purpose reference signal;

a second parameter set corresponding to a frequency domain resource of the positioning-purpose reference signal;

a sequence identifier of the positioning-purpose reference signal; and transmit power of the positioning-purpose reference signal.

In an embodiment of the present disclosure, the beam direction indication information refers to Quasi-colocation (QCL) type D information, and the Quasi-colocation type D information includes at least one of transmission configuration indication (TCL) state indication information and spatialrelationinfo.

In an embodiment of the present disclosure, the first parameter set includes one or more of the following parameters:

a cycle of the positioning-purpose reference signal; a starting time slot of the positioning-purpose reference signal; a starting symbol of the positioning-purpose reference signal; the number of symbols occupied by the positioning-purpose reference signal; and the number of transmission times of the positioning-purpose reference signal in one cycle of the positioning-purpose reference signal and an interval time between two transmission times of the positioning-purpose reference signal.

In an embodiment of the present disclosure, the second parameter set includes one or more of the following parameters:

frequency domain reference point A where the positioning-purpose reference signal is at; a bandwidth part identifier (BWP•ID) of the positioning-purpose reference signal; a bandwidth of the positioning-purpose reference signal; a starting resource block (RB) location of the positioning-purpose reference signal; a comb size (Combsize) of the positioning-purpose reference signal; and resource offset (RE•offset) of the positioning-purpose reference signal.

The frequency domain reference point A indicates an absolute frequency location, for example, in a 3410 kHz location, and the 3410 kHz location is used to indicate the starting RB location.

In an embodiment of the present disclosure, the N antenna ports correspond to N positioning-purpose reference signals, and the N positioning-purpose reference signals include one or more of the following:

resource set identifiers of the N positioning-purpose reference signals are the same;
resource identifiers of the N positioning-purpose reference signals are different;
antenna port identifiers of the N positioning-purpose reference signals are different;
beam directions indicated by beam direction indication information of the N positioning-purpose reference signals are different;
time domain resources corresponding to the first parameter set of the N positioning-purpose reference signals are the same;
frequency domain resources corresponding to the second parameter set of the N positioning-purpose reference signals are the same or different;
sequence identifiers of the N positioning-purpose reference signals are the same or different; and
transmit power of the N positioning-purpose reference signals is the same or different.

The beam directions of the N positioning-purpose reference signals are different, that is to say, transmitting the positioning-purpose reference signal with different network devices needs to use different beam directions, for example, different antenna ports and different beam directions need to be used when transmitting the positioning-purpose reference signal with different antenna panels of the base station where the Serving Cell is at, different transmission reception points of the base station where the Serving Cell is at, and base stations where different cells are at.

In an embodiment of the present disclosure, the N antenna ports respectively correspond to N PRSs, and the N PRSs include one or more of the following:

resource set identifiers of the N PRSs are the same;
resource identifiers of the N PRSs are different;
antenna port identifiers of the N PRSs are different;
beam directions of the N PRSs are different;
time domain resources corresponding to the first parameter set of the N PRSs are the same;
frequency domain resources corresponding to the second parameter set of the N PRSs are the same or different;
sequence identifiers of the N PRSs are the same or different; and
transmit power of the N PRSs is the same or different.

The beam directions of the N PRSs are different, that is to say, receiving the PRSs transmitted by different network devices needs to use different reception beam directions, for example, different antenna ports and different reception beam directions need to be used when receiving the PRSs transmitted by different antenna panels of the base station where the Serving Cell is at, different transmission reception points of the base station where the Serving Cell is at, and base stations where different cells are at.

In an embodiment of the present disclosure, the N antenna ports respectively correspond to N SRSs, and the N SRSs include one or more of the following:

resource set identifiers of the N SRSs are the same;
resource identifiers of the N SRSs are different;
antenna port identifiers of the N SRSs are different;
beam directions of the N SRSs are different;
time domain resources corresponding to the first parameter set of the N SRSs are the same;
frequency domain resources corresponding to the second parameter set of the N SRSs are the same or different;
sequence identifiers of the N SRSs are the same or different; and
transmit power of the N SRSs is the same or different.

The beam directions of the N SRSs are different, that is to say, transmitting the SRSs to different network devices needs to use different transmission beam directions, for example, different antenna ports and different transmission beam directions need to be used when transmitting the SRSs to different antenna panels of the base station where the Serving Cell is at, different transmission reception points of the base station where the Serving Cell is at, and base stations where different cells are at.

In an embodiment of the present disclosure, when second parameter sets of the N positioning-purpose reference signals are the same, frequency domain resources corresponding to the second parameter sets of the N positioning-purpose reference signals are the same; and when any one of parameters in the second parameter sets of the N positioning-purpose reference signals is different, the frequency domain resources corresponding to the second parameter sets of the N positioning-purpose reference signals are different.

In an embodiment of the present disclosure, when the second parameter sets of the N PRSs are the same, the frequency domain resources corresponding to the second parameter sets of the N PRSs are the same; and when any one of parameters in the second parameter sets of the N PRSs is different, the frequency domain resources corresponding to the second parameter sets of the N PRSs are different.

In an embodiment of the present disclosure, when second parameter sets of the N SRSs are the same, frequency domain resources corresponding to the second parameter sets of the N SRSs are the same; and when any one of parameters in the second parameter sets of the N SRSs is different, the frequency domain resources corresponding to the second parameter sets of the N SRSs are different.

In an embodiment of the disclosure, distances between different cells or different transmission reception points and the UE are different, and then transmit power of the positioning-purpose reference signal is different. When the SRS is transmitted to different cells or different transmission reception points through different ports, a reference signal used to determine transmit power of the SRS may be a reference signal from different cells or different transmission reception points.

In an embodiment of the present disclosure, the N antenna ports correspond to one positioning-purpose reference signal, and the positioning-purpose reference signal includes one or more of the following:

N antenna port identifiers are configured for one positioning-purpose reference signal;
N beam directions are configured for one positioning-purpose reference signal;

M second parameter sets are configured for one positioning-purpose reference signal, where M is a positive integer less than or equal to N;

X sequence identifiers are configured for one positioning-purpose reference signal, where X is a positive integer less than or equal to N; and Y transmit power is configured for one positioning-purpose reference signal, where Y is a positive integer less than or equal to N.

In an embodiment of the present disclosure, the network device configures one positioning-purpose reference signal for the UE, and a plurality of antenna ports and a plurality of beam directions corresponding to the plurality of antenna ports are configured for the positioning-purpose reference signal.

In an embodiment of the present disclosure, the configuration parameter information of the positioning-purpose reference signal includes first signaling, and the N antenna ports are configured in the first signaling; and transmitting the positioning-purpose reference signal with one or more network devices simultaneously through N antenna ports includes:

transmitting the positioning-purpose reference signal with the one or more network devices simultaneously through the N antenna ports configured in the first signaling.

In an embodiment of the present disclosure, the first signaling is configured with the N antenna ports and N beam directions corresponding to the N antenna ports.

In an embodiment of the present disclosure, the configuration parameter information of the positioning-purpose reference signal includes second signaling and triggering signaling, where L antenna ports are configured in the second signaling, and the triggering signaling is used to select the N antenna ports from the L antenna ports to indicate to the UE; and transmitting the positioning-purpose reference signal with one or more network devices simultaneously through N antenna ports includes:

selecting N antenna ports from the L antenna ports based on the triggering signaling; and transmitting the positioning-purpose reference signal with the one or more network devices simultaneously through the N antenna ports, where L is a positive integer.

In an embodiment of the present disclosure, the second signaling is configured with the L antenna ports and L beam directions corresponding to the N antenna ports.

In an embodiment of the present disclosure, the first signaling includes LTE positioning protocol (LPP) signaling and/or radio resource control (RRC) signaling.

In an embodiment of the present disclosure, the second signaling includes the LTE positioning protocol (LPP) signaling and/or the radio resource control (RRC) signaling.

In an embodiment of the present disclosure, the LPP signaling is signaling between the LMF and the UE.

In an embodiment of the present disclosure, selecting the N antenna ports from the L antenna ports to indicate to the UE is implemented through signaling indicated by a similar codebook included in the triggering signaling, for example, N=4 represents the number of antenna ports that the UE can support simultaneously; 4 bits are used to respectively represent the four antenna ports, where each bit corresponds to one antenna port; the bit displays 1, which represents that the antenna port is used for transmission; and the bit displays 0, which represents that the antenna port is not used for transmission. For example, 0001 represents that only a first antenna port is used for transmission, and 0011 represents that the first antenna port and a second antenna port are used for transmission.

In an embodiment of the present disclosure, the triggering signaling includes media access control (MAC) signaling and/or downlink control information (DCI) signaling.

In an embodiment of the present disclosure, the triggering signaling is further used to indicate the number of transmission times or transmission time of the positioning-purpose reference signal.

In an embodiment of the present disclosure, the beam direction indication information is used to indicate the beam direction of the positioning-purpose reference signal. The beam direction indication information includes a reference signal identifier corresponding to the beam direction.

The reference signal identifier may be a synchronization signal block identifier (SSBID), a channel state information reference signal identifier (CSI-RSID), a sounding reference signal identifier (SRSID), or a positioning reference signal identifier (PRSID).

In an embodiment of the present disclosure, the beam direction indication information further includes one or more of the following: an antenna panel identifier, a transmission and reception point (TRP) identifier, and a cell identifier.

In an embodiment of the present disclosure, the antenna panel identifier may be represented as reference signal identifiers or reference signal set identifiers of different antenna panels, and may also be represented as different control resource set (CORESETpoolindex, where CORESET is a control resource set) identifiers corresponding to different antenna panels; and a TRP identifier may be represented as reference signal identifiers or reference signal set identifiers of different TRPs, and may also be represented as different control resource set identifiers corresponding to different TRPs.

In an embodiment of the present disclosure, the antenna panel identifier may be represented as reference signal identifiers or reference signal set identifiers of different antenna panels, and may also be represented as different control resource set (CORESETpoolindex, where CORESET is a control resource set) identifiers corresponding to different antenna panels; and a TRP identifier may be represented as reference signal identifiers or reference signal set identifiers of different TRPs, and may also be represented as different control resource set identifiers.

In an embodiment of the present disclosure, the UE transmits the positioning-purpose reference signal with one or more network devices through the N antenna ports, and in this way, the positioning-purpose reference signal between user equipment (UE) and a plurality of network devices may be transmitted simultaneously through transmission based on positioning-purpose reference signals of a plurality of antenna ports, and it is implemented that the UE can measure positioning measurement parameters between the UE and the plurality of network devices simultaneously, such that positioning time latency is reduced and positioning accuracy is improved.

Figure 3:
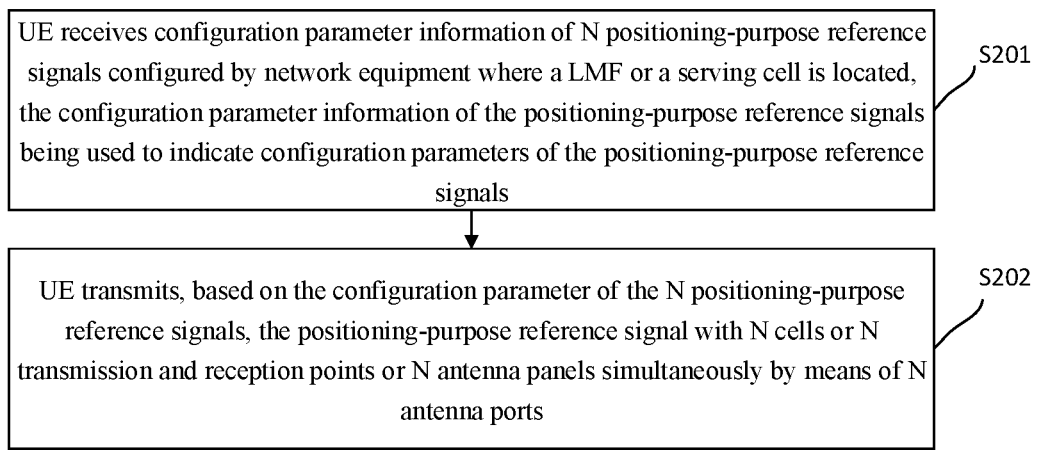
FIG. 3 is a schematic flowchart of a method for transmitting a positioning-purpose reference signal according to an embodiment of the present disclosure.

In an embodiment of the present disclosure, there is provided a method for transmitting a positioning-purpose reference signal, and a schematic flowchart of the method is shown in FIG. 3, the method including:

S201: UE receiving configuration parameter information of N positioning-purpose reference signals configured by a network device where a LMF or a Serving Cell is located, where the configuration parameter information of the positioning-purpose reference signals is used to indicate configuration parameters of the positioning-purpose reference signals.

In an embodiment of the present disclosure, the network device where the LMF or the Serving Cell is located is configured with the configuration parameter information of the N positioning-purpose reference signals, and the configuration parameter information of the N positioning-purpose reference signals corresponds to configuration parameters of the N positioning-purpose reference signals.

S202: the UE transmitting, based on the configuration parameter of the N positioning-purpose reference signals, the positioning-purpose reference signal with N cells or N transmission and reception points or N antenna panels simultaneously through the N antenna ports.

In an embodiment of the present application, the UE simultaneously receives N PRSs transmitted by the N cells or the N transmission reception points or the N antenna panels through the N antenna ports; or the UE transmits N PRSs to the N cells or the N transmission reception points or the N antenna panels through the N antenna ports.

In an embodiment of the present disclosure, the UE transmits the N positioning-purpose reference signals with the N cells or the N transmission reception points (the N transmission reception points are transmission reception points of different cells or different transmission reception points of the same cell) or the N antenna panels (the N antenna panels are antenna panels of different cells or antenna panels of the different transmission reception points of the same cell or different antenna panels of the same transmission reception point). In this way, the N positioning-purpose reference signals between the UE and the N cells or the N transmission reception points or the N antenna cells may be transmitted simultaneously by means of transmission based on the positioning-purpose reference signals of the N antenna ports, and it is implemented that the UE can simultaneously measure positioning measurement parameters between the UE and the N cells or the N transmission reception points or the N antenna panels, such that positioning time latency is reduced and positioning accuracy is improved.

The content not described in detail in the method for transmitting a positioning-purpose reference signal provided by FIG. 2 may refer to the above FIG. 1 and the method for transmitting a positioning-purpose reference signal provided in any one of embodiments of the present disclosure, which is not described in detail.

Based on the same invention concept, an embodiment of the present disclosure further provides an apparatus for transmitting a positioning-purpose reference signal, and the apparatus for transmitting a positioning-purpose reference signal is applied to UE and includes a first processing module.

The first processing module is configured to transmit the positioning-purpose reference signal with one or more network devices simultaneously through N antenna ports, where N is a positive integer greater than 1.

In an embodiment of the present disclosure, the first processing module is specifically configured to receive a PRS included in the positioning-purpose reference signal transmitted by one or more network devices simultaneously through the N antenna ports or transmit an SRS included in the positioning-purpose reference signal to the one or more network devices simultaneously through the N antenna ports.

In an embodiment of the present disclosure, the first processing module is specifically configured to: receive configuration parameter information of the positioning-purpose reference signal configured by network device where a Serving Cell is located and/or a long term evolution (LTE) location management function (LMF), the configuration parameter information of the positioning-purpose reference signal being used to indicate a configuration parameter of the positioning-purpose reference signal; and based on the configuration parameter of the positioning-purpose reference signal, transmit the positioning-purpose reference signal with one or more network devices through N antenna ports.

In an embodiment of the present disclosure, the configuration parameter of the positioning-purpose reference signal includes one or more of the following:
a resource set identifier of the positioning-purpose reference signal;
a resource identifier of the positioning-purpose reference signal;
an antenna port identifier of the positioning-purpose reference signal;
a beam direction of the positioning-purpose reference signal;
a first parameter set corresponding to a time domain resource of the positioning-purpose reference signal;
a second parameter set corresponding to a frequency domain resource of the positioning-purpose reference signal;
a sequence identifier of the positioning-purpose reference signal; and
transmit power of the positioning-purpose reference signal.

In an embodiment of the present disclosure, the first parameter set includes one or more of the following parameters:
a cycle of the positioning-purpose reference signal; a starting time slot of the positioning-purpose reference signal; a starting symbol of the positioning-purpose reference signal; the number of symbols occupied by the positioning-purpose reference signal; and the number of transmission times of the positioning-purpose reference signal in one cycle of the positioning-purpose reference signal and an interval time between two transmission times of the positioning-purpose reference signal.

In an embodiment of the present disclosure, the second parameter set includes one or more of the following parameters:
frequency domain reference point A where the positioning-purpose reference signal is at; a bandwidth part identifier (BWP•ID) of the positioning-purpose reference signal; a bandwidth of the positioning-purpose reference signal; a starting resource block location of the positioning-purpose reference signal; a comb size (Combsize) of the positioning-purpose reference signal; and resource offset (RE•offset) of the positioning-purpose reference signal.

In an embodiment of the present disclosure, the N antenna ports corresponds to N positioning-purpose reference signals, and the N positioning-purpose reference signals include one or more of the following:
resource set identifiers of the N positioning-purpose reference signals are the same;
resource identifiers of the N positioning-purpose reference signals are different;
antenna port identifiers of the N positioning-purpose reference signals are different;

beam directions indicated by beam direction indication information of the N positioning-purpose reference signals are different;

time domain resources corresponding to the first parameter set of the N positioning-purpose reference signals are the same;

frequency domain resources corresponding to the second parameter set of the N positioning-purpose reference signals are the same or different;

sequence identifiers of the N positioning-purpose reference signals are the same or different; and transmit power of the N positioning-purpose reference signals is the same or different.

In an embodiment of the present disclosure, the N antenna ports correspond to one positioning-purpose reference signal, and the positioning-purpose reference signal includes one or more of the following:

N antenna port identifiers are configured for one positioning-purpose reference signal;

N beam directions are configured for one positioning-purpose reference signal;

M second parameter sets are configured for one positioning-purpose reference signal, where M is a positive integer less than or equal to N;

X sequence identifiers are configured for one positioning-purpose reference signal, where X is a positive integer less than or equal to N; and Y transmit power is configured for one positioning-purpose reference signal, where Y is a positive integer less than or equal to N.

In an embodiment of the present disclosure, one configuration parameter information of the positioning-purpose reference signal includes first signaling, and the N antenna ports are configured in the first signaling; and transmitting the positioning-purpose reference signal with one or more network devices simultaneously through N antenna ports includes:

transmitting the positioning-purpose reference signal with the one or more network devices simultaneously through the N antenna ports configured in the first signaling.

In an embodiment of the present disclosure, the configuration parameter information of the positioning-purpose reference signal includes second signaling and triggering signaling, where L antenna ports are configured in the second signaling, and the triggering signaling is used to select the N antenna ports from the L antenna ports to indicate to the UE; and transmitting the positioning-purpose reference signal with one or more network devices simultaneously through N antenna ports includes:

selecting N antenna ports from the L antenna ports based on the triggering signaling; and transmitting the positioning-purpose reference signal with the one or more network devices simultaneously through the N antenna ports, where L is a positive integer.

In an embodiment of the present disclosure, the first signaling includes LTE positioning protocol (LPP) signaling and/or radio resource control (RRC) signaling.

In an embodiment of the present disclosure, the second signaling includes the LTE positioning protocol (LPP) signaling and/or the radio resource control (RRC) signaling. In an embodiment of the present disclosure, the triggering signaling includes media access control (MAC) signaling and/or downlink control information (DCI) signaling.

In an embodiment of the present disclosure, the triggering signaling is further used to indicate the number of transmission times or transmission time of the positioning-purpose reference signal.

In an embodiment of the present disclosure, the beam direction indication information includes a reference signal identifier corresponding to a beam direction.

The reference signal identifier may be a synchronization signal block identifier (SSB•ID), a channel state information reference signal identifier (CSI-RS•ID), a sounding reference signal identifier (SRS•ID), or a positioning reference signal identifier (PRS•ID).

According to an embodiment of the present disclosure, the beam direction indication information further includes one or more of the following:

an antenna panel identifier, a transmission reception TRP identifier, and a cell identifier.

In an embodiment of the present disclosure, the antenna panel identifier may be represented as reference signal identifiers or reference signal set identifiers of different antenna panels, and may also be represented as different control resource set (CORESETpoolindex, where CORESET is a control resource set) identifiers corresponding to different antenna panels; and a TRP identifier may be represented as reference signal identifiers or reference signal set identifiers of different TRPs, and may also be represented as different control resource set identifiers.

Applying the embodiments of the present disclosure at least has the following beneficial effects:

The UE transmits the positioning-purpose reference signal with one or more network devices through N antenna ports, and in this way, the positioning-purpose reference signal between user equipment (UE) and a plurality of network devices may be transmitted simultaneously by means of transmission based on positioning-purpose reference signals of a plurality of antenna ports, and it is implemented that the UE can measure positioning measurement parameters between the UE and the plurality of network devices simultaneously, such that positioning time latency is reduced and positioning accuracy is improved.

Figure 4:
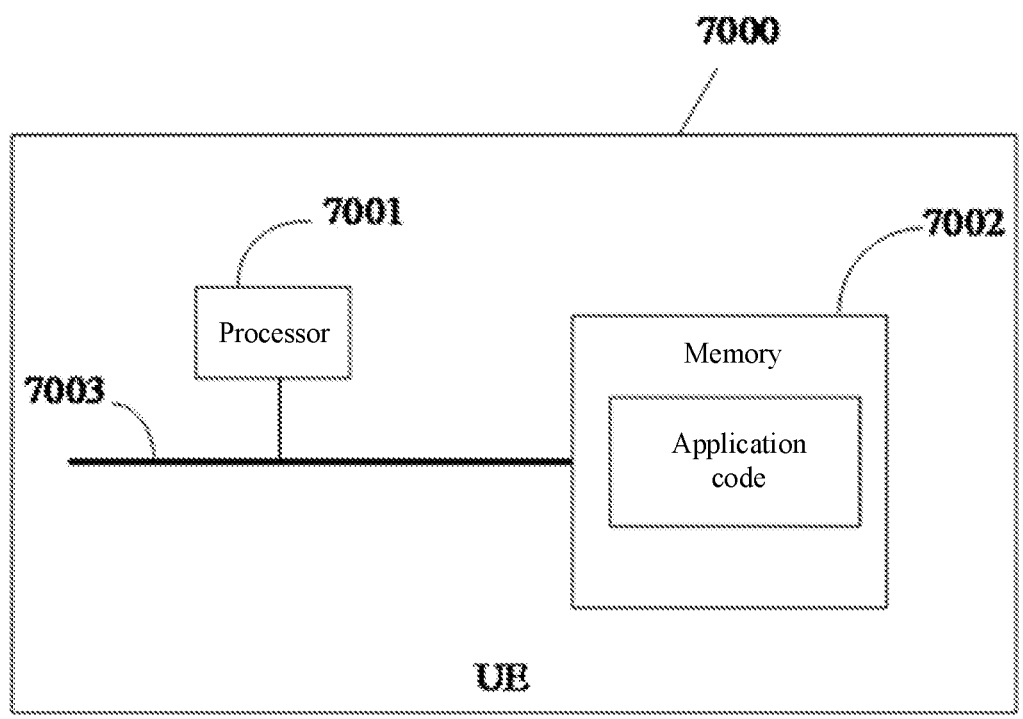
FIG. 4 is a schematic structural diagram of user equipment (UE) according to an embodiment of the present disclosure.

Based on the same invention concept, an embodiment of the present disclosure further provides a kind of UE, a schematic structural diagram of the UE is as shown in FIG. 4. The UE 7000 includes at least one processor 7001, a memory 7002, and a bus 7003, where the at least one processor 7001 is in electric connection with the memory 7002, the memory 7002 is configured to store at least one computer-executable instruction, and the processor 7001 is configured to execute the at least one computer-executable instruction, such that steps of any one of methods for transmitting a positioning-purpose reference signal provided by any one of embodiments or any one of optional implementations in the present disclosure are performed.

Further, the processor 7001 may be a field-programmable gate array (FPGA) or other devices having a logic processing capability, such as a microcontroller unit (MCU), and a central process unit (CPU).

Applying the embodiments of the present disclosure at least has the following beneficial effects:

The UE transmits the positioning-purpose reference signal with one or more network devices through N antenna ports, and in this way, the positioning-purpose reference signal between user equipment (UE) and a plurality of network devices may be transmitted simultaneously by means of transmission based on positioning-purpose reference signals of a plurality of antenna ports, and it is implemented that the UE can measure positioning measurement parameters between the UE and the plurality of network devices simultaneously, such that positioning time latency is reduced and positioning accuracy is improved.

Based on the same invention concept, an embodiment of the present disclosure further provides another computer-readable storage medium storing a computer program, and when executed by the processor, the computer program implements steps of any one of methods for transmitting a positioning-purpose reference signal provided by any one of embodiments or any one of optional implementations in the present disclosure.

The computer-readable storage medium provided by an embodiment of the present disclosure includes but is not limited to any types of disks (including a soft disk, a hard disk, an optic disk, a compact disc read-only memory (CD-ROM), and a magneto-optical disk), a read-only memory (ROM), a random access memory (RAM), an erasable programmable read-only memory (EPROM), an electrically erasable programmable read-only memory (EEPROM), a flash memory, a magnetic card, or an optical card, that is, the readable storage medium includes any mediums in which information is stored or transmitted in a readable form by equipment (e.g., a computer).

Applying the embodiments of the present disclosure at least has the following beneficial effects:

The UE transmits the positioning-purpose reference signal with one or more network devices through N antenna ports, and in this way, the positioning-purpose reference signal between user equipment (UE) and a plurality of network devices may be transmitted simultaneously by means of transmission based on positioning-purpose reference signals of a plurality of antenna ports, and it is implemented that the UE can measure positioning measurement parameters between the UE and the plurality of network devices simultaneously, such that positioning time latency is reduced and positioning accuracy is improved.

Those skilled in the art may understand that computer program instructions may be used to implement each block in these structural diagrams and/or block diagrams and/or flowcharts and combinations of these structural diagrams and/or block diagrams and/or flowcharts. Those skilled in the art may understand that these computer program instructions may be provided for a processor of a general-purpose computer, a dedicated computer, or another programmable data processing method to implement each block in these structural diagrams and/or block diagrams and/or flowcharts and combinations of these structural diagrams and/or block diagrams and/or flowcharts, so that specified solutions in a block or a plurality blocks of structural diagrams and/or block diagrams and/or flowcharts disclosed in the present disclosure are executed by means of the processor of the computer or another programmable data processing method.

Those skilled in the art may understand that steps, measures, and solutions in various operations, methods, and processes having been discussed in the present disclosure may be alternated, changed, combined, or deleted. Further, other steps, measures, and solutions having various operations, methods, and processes having been discussed in the present disclosure may also be alternated, changed, reordered, decomposed, combined, or deleted. Further, steps, measures, and solutions having various operations, methods, and processes disclosed in the present disclosure in the prior art may also be alternated, changed, reordered, decomposed, combined, or deleted.

The above are merely part of implementations of the present disclosure, and it should be noted that, for those of ordinary skill in the art, a plurality of improvements and modifications may be made without departing from the principle of the present invention, and the improvements and modifications are also regarded to be within the protection scope of the present disclosure.

Additional non-limiting embodiments of the disclosure include:

1. A method for transmitting a positioning-purpose reference signal which is applied to user equipment (UE), the method including:
   transmitting the positioning-purpose reference signal with one or more network devices simultaneously through N antenna ports, where N is a positive integer greater than 1.

2. The method according to embodiment 1, transmitting the positioning-purpose reference signal with one or more network devices simultaneously through N antenna ports includes:
   simultaneously receiving a downlink positioning reference signal (PRS) included in the positioning-purpose reference signal transmitted by the one or more network devices through the N antenna ports;
   or transmitting an uplink sounding reference signal (SRS) included in the positioning-purpose reference signal to the one or more network devices simultaneously through the N antenna ports.

3. The method according to embodiment 1 or 2, transmitting the positioning-purpose reference signal with one or more network devices simultaneously through N antenna ports includes:
   receiving configuration parameter information of the positioning-purpose reference signal configured by the network device where a Serving Cell is located and/or a long term evolution (LTE) location management function (LMF), where the configuration parameter information of the positioning-purpose reference signal is used to indicate a configuration parameter of the positioning-purpose reference signal; and
   transmitting, based on the configuration parameter of the positioning-purpose reference signal, the positioning-purpose reference signal with the one or more network devices simultaneously through the N antenna ports.

4. The method according to embodiment 3, the configuration parameter of the positioning-purpose reference signal includes one or more of the following:
   a resource set identifier of the positioning-purpose reference signal;
   a resource identifier of the positioning-purpose reference signal;
   an antenna port identifier of the positioning-purpose reference signal;
   beam direction indication information of the positioning-purpose reference signal;
   a first parameter set corresponding to a time domain resource of the positioning-purpose reference signal;
   a second parameter set corresponding to a frequency domain resource of the positioning-purpose reference signal;
   a sequence identifier of the positioning-purpose reference signal; and
   transmit power of the positioning-purpose reference signal.

5. The method according to embodiment 4, the first parameter set includes one or more parameters in the following:
   a cycle of the positioning-purpose reference signal; a starting time slot of the positioning-purpose reference signal; a starting symbol of the positioning-purpose reference signal; the number of symbols occupied by the positioning-purpose reference signal; and the number of transmission times of the positioning-purpose reference signal in one cycle of the positioning-purpose reference signal and an interval time between two transmission times of the positioning-purpose reference signal.

6. The method according to embodiment 4, the second parameter set includes one or more parameters in the following:

frequency domain reference point A where the positioning-purpose reference signal is at; a bandwidth part identifier (BWP•ID) of the positioning-purpose reference signal; a bandwidth of the positioning-purpose reference signal; a starting resource block (RB) location of the positioning-purpose reference signal; a comb size (Combsize) of the positioning-purpose reference signal; and resource offset (RE•offset) of the positioning-purpose reference signal.

7. The method according to embodiment 4, the N antenna ports correspond to N positioning-purpose reference signals, and the N positioning-purpose reference signals include one or more of the following:

resource set identifiers of the N positioning-purpose reference signals are the same;
resource identifiers of the N positioning-purpose reference signals are different;
antenna port identifiers of the N positioning-purpose reference signals are different;
beam directions indicated by beam direction indication information of the N positioning-purpose reference signals are different;
time domain resources corresponding to the first parameter set of the N positioning-purpose reference signals are the same;
frequency domain resources corresponding to the second parameter set of the N positioning-purpose reference signals are the same or different;
sequence identifiers of the N positioning-purpose reference signals are the same or different; and
transmit power of the N positioning-purpose reference signals is the same or different.

8. The method according to embodiment 4, the N antenna ports correspond to one positioning-purpose reference signal, and the positioning-purpose reference signal includes one or more of the following:

N antenna port identifiers are configured for the one positioning-purpose reference signal;
N beam directions are configured for the one positioning-purpose reference signal;
M second parameter sets are configured for the one positioning-purpose reference signal, where M is a positive integer less than or equal to N;
X sequence identifiers are configured for the one positioning-purpose reference signal, where X is a positive integer less than or equal to N; and
Y transmit power is configured for the one positioning-purpose reference signal, where Y is a positive integer less than or equal to N.

9. The method according to embodiment 3, the configuration parameter information of the positioning-purpose reference signal includes first signaling, and the N antenna ports are configured in the first signaling; and the transmitting the positioning-purpose reference signal with one or more network devices simultaneously through N antenna ports includes:

transmitting the positioning-purpose reference signal with the one or more network devices simultaneously through the N antenna ports configured in the first signaling.

10. The method according to embodiment 3, the configuration parameter information of the positioning-purpose reference signal includes second signaling and triggering signaling, where L antenna ports are configured in the second signaling, and the triggering signaling is used to select the N antenna ports from the L antenna ports to indicate to the UE; and the transmitting the positioning-purpose reference signal with one or more network devices simultaneously through N antenna ports includes:

selecting the N antenna ports from the L antenna ports based on the triggering signaling; and
transmitting the positioning-purpose reference signal with the one or more network devices simultaneously through the N antenna ports, where L is a positive integer.

11. The method according to embodiment 9, the first signaling includes LTE positioning protocol (LPP) signaling and/or radio resource control (RRC) signaling.

12. The method according to embodiment 10, the second signaling includes the LTE positioning protocol (LPP) signaling and/or the radio resource control (RRC) signaling.

13. The method according to embodiment 10 or 12, the triggering signaling includes media access control (MAC) signaling and/or downlink control information (DCI) signaling.

14. The method according to embodiment 10 or 12, the triggering signaling is further used to indicate the number of transmission times or transmission time of the positioning-purpose reference signal.

15. The method according to embodiment 4, the beam direction indication information includes a reference signal identifier corresponding to the beam direction, the reference signal identifier may be a synchronization signal block identifier (SSB•ID), a channel state information reference signal identifier (CSI-RS•ID), a sounding reference signal identifier (SRS•ID), or a positioning reference signal identifier (PRS•ID).

16. The method according to embodiment 15, the beam direction indication information further includes one or more of the following: an antenna panel identifier, a transmission and reception point (TRP) identifier, and a cell identifier, the antenna panel identifier may be represented as reference signal identifiers or reference signal set identifiers of different antenna panels, and may also be represented as different control resource set (CORESETpoolindex, where CORESET is a control resource set) identifiers corresponding to different antenna panels; and a TRP identifier may be represented as reference signal identifiers or reference signal set identifiers of different TRPs, and may also be represented as different control resource set identifiers corresponding to different TRPs.

17. An apparatus for transmitting a positioning-purpose reference signal, which is applied to UE, the apparatus including:

a first processing module is configured to transmit the positioning-purpose reference signal with one or more network devices simultaneously through N antenna ports, where N is a positive integer greater than 1.

18. The apparatus for transmitting a positioning-purpose reference signal according to embodiment 17, the first processing module is specifically configured to receive a downlink positioning reference signal (PRS) included in the positioning-purpose reference signal transmitted by one or more network devices simultaneously through the N antenna ports, or transmit an uplink sounding reference signal (SRS) included in the positioning-purpose reference signal to the one or more network devices simultaneously through the N antenna ports.

19. The apparatus for transmitting a positioning-purpose reference signal according to embodiment 17 or 18, the first processing module is specifically configured to: receive configuration parameter information of the positioning-purpose reference signal configured by network device where a Serving Cell is located and/or a long term evolution (LTE) location management function (LMF), where the configuration parameter information of the positioning-purpose reference signal is used to indicate a configuration parameter of the positioning-purpose reference signal; and based on the configuration parameter of the positioning-purpose reference signal, transmit the positioning-purpose reference signal with one or more network devices through N antenna ports.

20. The apparatus for transmitting a positioning-purpose reference signal according to embodiment 19, the configuration parameter of the positioning-purpose reference signal includes one or more of the following:
a resource set identifier of the positioning-purpose reference signal;
a resource identifier of the positioning-purpose reference signal;
an antenna port identifier of the positioning-purpose reference signal;
a beam direction of the positioning-purpose reference signal;
a first parameter set corresponding to a time domain resource of the positioning-purpose reference signal;
a second parameter set corresponding to a frequency domain resource of the positioning-purpose reference signal;
a sequence identifier of the positioning-purpose reference signal; and
transmit power of the positioning-purpose reference signal.

21. The apparatus for transmitting a positioning-purpose reference signal according to embodiment 20, the first parameter set includes one or more of the following parameters:
a cycle of the positioning-purpose reference signal; a starting time slot of the positioning-purpose reference signal; a starting symbol of the positioning-purpose reference signal; the number of symbols occupied by the positioning-purpose reference signal; and the number of transmission times of the positioning-purpose reference signal in one cycle of the positioning-purpose reference signal and an interval time between two transmission times of the positioning-purpose reference signal.

22. The apparatus for transmitting a positioning-purpose reference signal according to embodiment 20, the second parameter set includes one or more of the following parameters:
frequency domain reference point A where the positioning-purpose reference signal is at; a bandwidth part identifier (BWP•ID) of the positioning-purpose reference signal; a bandwidth of the positioning-purpose reference signal; a starting resource block location of the positioning-purpose reference signal; a comb size (Combsize) of the positioning-purpose reference signal; and resource offset (RE•offset) of the positioning-purpose reference signal.

23. The apparatus for transmitting a positioning-purpose reference signal according to embodiment 20, the N antenna ports corresponds to N positioning-purpose reference signals, and the N positioning-purpose reference signals include one or more of the following:
resource set identifiers of the N positioning-purpose reference signals are the same;
resource identifiers of the N positioning-purpose reference signals are different;
antenna port identifiers of the N positioning-purpose reference signals are different;
beam directions indicated by beam direction indication information of the N positioning-purpose reference signals are different;
time domain resources corresponding to the first parameter set of the N positioning-purpose reference signals are the same;
frequency domain resources corresponding to the second parameter set of the N positioning-purpose reference signals are the same or different;
sequence identifiers of the N positioning-purpose reference signals are the same or different; and
transmit power of the N positioning-purpose reference signals is the same or different.

24. The apparatus for transmitting a positioning-purpose reference signal according to embodiment 20, the N antenna ports correspond to one positioning-purpose reference signal, and the positioning-purpose reference signal includes one or more of the following:
N antenna port identifiers are configured for one positioning-purpose reference signal;
N beam directions are configured for one positioning-purpose reference signal;
M second parameter sets are configured for one positioning-purpose reference signal, where M is a positive integer less than or equal to N;
X sequence identifiers are configured for one positioning-purpose reference signal, where X is a positive integer less than or equal to N; and
Y transmit power is configured for one positioning-purpose reference signal, where Y is a positive integer less than or equal to N.

25. The apparatus for transmitting a positioning-purpose reference signal according to embodiment 19, the configuration parameter information of the positioning-purpose reference signal includes first signaling, and the N antenna ports are configured in the first signaling; and
transmitting the positioning-purpose reference signal with one or more network devices simultaneously through N antenna ports includes:
transmitting the positioning-purpose reference signal with the one or more network devices simultaneously through the N antenna ports configured in the first signaling.

26. The apparatus for transmitting a positioning-purpose reference signal according to embodiment 19, configuration parameter information of a positioning-purpose reference signal includes second signaling and triggering signaling, where L antenna ports are configured in the second signaling, and the triggering signaling is used to select the N antenna ports from the L antenna ports to indicate to the UE; and transmitting the positioning-purpose reference signal with one or more network devices simultaneously through N antenna ports includes:

selecting N antenna ports from the L antenna ports based on the triggering signaling; and transmitting the positioning-purpose reference signal with the one or more network devices simultaneously through the N antenna ports, where L is a positive integer.

27. The apparatus for transmitting a positioning-purpose reference signal according to embodiment 25, the first signaling includes LTE positioning protocol (LPP) signaling and/or radio resource control (RRC) signaling.

28. The apparatus for transmitting a positioning-purpose reference signal according to embodiment 26, the second signaling includes the LTE positioning protocol (LPP) signaling and/or the radio resource control (RRC) signaling.

29. The apparatus for transmitting a positioning-purpose reference signal according to embodiment 26 or 28, the triggering signaling includes media access control (MAC) signaling and/or downlink control information (DCI) signaling.

30. The apparatus for transmitting a positioning-purpose reference signal according to embodiment 26 or 28, the triggering signaling is further used to indicate the number of transmission times or transmission time of the positioning-purpose reference signal.

31. The apparatus for transmitting a positioning-purpose reference signal according to embodiment 20, the beam direction indication information includes a reference signal identifier corresponding to a beam direction.

32. The apparatus for transmitting a positioning-purpose reference signal according to embodiment 31, the reference signal identifier may be a synchronization signal block identifier (SSBID), a channel state information reference signal identifier (CSI-RSID), a sounding reference signal identifier (SRS•ID), or a positioning reference signal identifier (PRS•ID).

33. The apparatus for transmitting a positioning-purpose reference signal according to embodiment 31, the beam direction indication information further includes one or more of the following: an antenna panel identifier, a transmission and reception point (TRP) identifier, and a cell identifier.

34. The apparatus for transmitting a positioning-purpose reference signal according to embodiment 33, the antenna panel identifier may be represented as reference signal identifiers or reference signal set identifiers of different antenna panels, and may also be represented as different control resource set (CORESET-poolindex, where CORESET is a control resource set) identifiers corresponding to different antenna panels; and a TRP identifier may be represented as reference signal identifiers or reference signal set identifiers of different TRPs, and may also be represented as different control resource set identifiers corresponding to different TRPs.

35. A kind of user equipment (UE) including: a processor, a memory, and a bus, where the bus is configured to be connected to the processor and the memory; the memory is configured to store operation instructions; and the processor is configured to perform the method for transmitting a positioning-purpose reference signal according to any one of embodiments 1-16 of the present disclosure by calling the operation instructions.

36. A non-transitory computer-readable storage medium storing a computer program, and the computer program is used to perform the method for transmitting a positioning-purpose reference signal according to any one of embodiments 1-16 of the present disclosure.

The invention claimed is:

1. A method for transmitting a positioning-purpose reference signal, performed by a user equipment (UE), the method comprising:
receiving configuration parameter information of the positioning-purpose reference signal configured by at least one of a network device where a serving cell is located or a long term evolution (LTE) location management function (LMF), wherein the configuration parameter information of the positioning-purpose reference signal is configured to indicate a configuration parameter of the positioning-purpose reference signal, the configuration parameter information of the positioning-purpose reference signal comprises second signaling and triggering signaling, L antenna ports are configured in the second signaling, the triggering signaling is configured to select N antenna ports from the L antenna ports and to indicate the selected N antenna ports to the UE, wherein L is a positive integer and N is a positive integer greater than 1;
selecting the N antenna ports from the L antenna ports based on the triggering signaling; and
receiving simultaneously, through the N antenna ports, downlink positioning reference signals (PRSs) comprised in the positioning-purpose reference signal transmitted by one or more network devices, or transmitting simultaneously, through the N antenna ports, uplink sounding reference signals (SRSs) comprised in the positioning-purpose reference signal to the one or more network devices.

2. The method according to claim 1, wherein the configuration parameter of the positioning-purpose reference signal comprises one or more of the following:
a resource set identifier of the positioning-purpose reference signal;
a resource identifier of the positioning-purpose reference signal;
an antenna port identifier of the positioning-purpose reference signal;
beam direction indication information of the positioning-purpose reference signal;
a first parameter set corresponding to a time domain resource of the positioning-purpose reference signal;
a second parameter set corresponding to a frequency domain resource of the positioning-purpose reference signal;
a sequence identifier of the positioning-purpose reference signal; or
transmit power of the positioning-purpose reference signal.

3. The method according to claim 2, wherein the first parameter set comprises one or more of the following parameters:
a cycle of the positioning-purpose reference signal;
a starting time slot of the positioning-purpose reference signal;
a starting symbol of the positioning-purpose reference signal;

a number of symbols occupied by the positioning-purpose reference signal; or a number of transmission times of the positioning-purpose reference signal in one cycle of the positioning-purpose reference signal and an interval time between two transmission times of the positioning-purpose reference signal.

4. The method according to claim 2, wherein the second parameter set comprises one or more of the following parameters:
frequency domain reference point A where the positioning-purpose reference signal is at;
a bandwidth part identifier (BWP•ID) of the positioning-purpose reference signal;
a bandwidth of the positioning-purpose reference signal;
a starting resource block location of the positioning-purpose reference signal;
a comb size (Combsize) of the positioning-purpose reference signal; or
resource offset (RE•offset) of the positioning-purpose reference signal.

5. The method according to claim 2, wherein the N antenna ports correspond to N positioning-purpose reference signals, and the N positioning-purpose reference signals comprise one or more of the following:
resource set identifiers of the N positioning-purpose reference signals are the same;
resource identifiers of the N positioning-purpose reference signals are different;
antenna port identifiers of the N positioning-purpose reference signals are different;
beam directions indicated by beam direction indication information of the N positioning-purpose reference signals are different;
time domain resources corresponding to the first parameter set of the N positioning-purpose reference signals are the same;
frequency domain resources corresponding to the second parameter set of the N positioning-purpose reference signals are the same or different;
sequence identifiers of the N positioning-purpose reference signals are the same or different; or
transmit power of the N positioning-purpose reference signals is the same or different.

6. The method according to claim 2, wherein the N antenna ports correspond to one positioning-purpose reference signal, and the one positioning-purpose reference signal comprises one or more of the following:
N antenna port identifiers are configured for the one positioning-purpose reference signal;
N beam directions are configured for the one positioning-purpose reference signal;
M second parameter sets are configured for the one positioning-purpose reference signal, wherein M is a positive integer less than or equal to N;
X sequence identifiers are configured for the one positioning-purpose reference signal, wherein X is a positive integer less than or equal to N; or
Y transmit power is configured for the one positioning-purpose reference signal, wherein Y is a positive integer less than or equal to N.

7. The method according to claim 2, wherein the beam direction indication information comprises one or more of the following: a reference signal identifier corresponding to the beam direction, an antenna panel identifier, a transmission and reception point (TRP) identifier, or a cell identifier.

8. The method according to claim 1, wherein the configuration parameter information of the positioning-purpose reference signal comprises first signaling, and the N antenna ports are configured in the first signaling; and
the method comprises:
receiving simultaneously, through the N antenna ports configured in the first signaling, the downlink PRS comprised in the positioning-purpose reference signal transmitted by the one or more network devices, or transmitting simultaneously, through the N antenna ports configured in the first signaling, the uplink SRS comprised in the positioning-purpose reference signal to the one or more network devices.

9. The method according to claim 8, wherein the first signaling comprises LTE positioning protocol (LPP) signaling and/or radio resource control (RRC) signaling.

10. The method according to claim 1, wherein the second signaling comprises LTE positioning protocol (LPP) signaling and/or radio resource control (RRC) signaling.

11. The method according to claim 1, wherein the triggering signaling comprises media access control (MAC) signaling and/or downlink control information (DCI) signaling;
the triggering signaling is further configured to indicate a number of transmission times or transmission time of the positioning-purpose reference signal.

12. A user equipment (UE), comprising:
one or more processors; and
a memory configured to store processor-executable instructions,
wherein the processor-executable instructions, when collectively executed by the one or more processors, cause the UE to:
receive configuration parameter information of the positioning-purpose reference signal configured by at least one of a network device where a serving cell is located or a long term evolution (LTE) location management function (LMF) wherein the configuration parameter information of the positioning-purpose reference signal is configured to indicate a configuration parameter of the positioning-purpose reference signal, the configuration parameter information of the positioning-purpose reference signal comprises second signaling and triggering signaling, L antenna ports are configured in the second signaling, the triggering signaling is configured to select N antenna ports from the L antenna ports and to indicate the selected N antenna ports to the UE, wherein L is a positive integer and N is a positive integer greater than 1;
select the N antenna ports from the L antenna ports based on the triggering signaling; and
receive simultaneously, through the N antenna ports, a downlink positioning reference signal (PRS) comprised in the positioning-purpose reference signal transmitted by one or more network devices, or transmit simultaneously, through the N antenna ports, an uplink sounding reference signal (SRS) comprised in the positioning-purpose reference signal to the one or more network devices.

13. The UE according to claim 12, wherein
the configuration parameter information of the positioning-purpose reference signal comprises first signaling, and the N antenna ports are configured in the first signaling; and
the processor-executable instructions, when collectively executed by the one or more processors, further cause the UE to:

receive simultaneously, through the N antenna ports configured in the first signaling, the downlink PRS comprised in the positioning-purpose reference signal transmitted by the one or more network devices, or transmit simultaneously, through the N antenna ports configured in the first signaling, the uplink SRS comprised in the positioning-purpose reference signal to the one or more network devices.

14. A non-transitory computer-readable storage medium storing a computer program, wherein the computer program, when executed by one or more processors of a user equipment (UE), causes the UE to:

receive configuration parameter information of the positioning-purpose reference signal configured by at least one of a network device where a serving cell is located or a long term evolution (LTE) location management function (LMF), wherein the configuration parameter information of the positioning-purpose reference signal is configured to indicate a configuration parameter of the positioning-purpose reference signal, the configuration parameter information of the positioning-purpose reference signal comprises second signaling and triggering signaling, L antenna ports are configured in the second signaling, the triggering signaling is configured to select N antenna ports from the L antenna ports and to indicate the selected N antenna ports to the UE, wherein L is a positive integer and N is a positive integer greater than 1;

select the N antenna ports from the L antenna ports based on the triggering signaling; and receive simultaneously, through the N antenna ports, a downlink positioning reference signal (PRS) comprised in the positioning-purpose reference signal transmitted by one or more network devices, or transmit simultaneously, through the N antenna ports, an uplink sounding reference signal (SRS) comprised in the positioning-purpose reference signal to the one or more network devices.

15. The non-transitory computer-readable storage medium according to claim 14, wherein the configuration parameter information of the positioning-purpose reference signal comprises first signaling, and the N antenna ports are configured in the first signaling; and the computer program, when executed by the one or more processors, further causes the UE to:

receive simultaneously, through the N antenna ports configured in the first signaling, the downlink PRS comprised in the positioning-purpose reference signal transmitted by the one or more network devices, or transmit simultaneously, through the N antenna ports configured in the first signaling, the uplink SRS comprised in the positioning-purpose reference signal to the one or more network devices.

* * * * *